Patented Mar. 15, 1927.

1,620,898

UNITED STATES PATENT OFFICE.

ALBERT E. KIDD, JR., OF CHICAGO, ILLINOIS.

FOOD PRODUCT.

No Drawing.     Application filed March 31, 1926. Serial No. 98,922.

The present invention relates to a food product and process for making same, and more particularly peanut butter compounds.

The main objects of this invention are to provide an improved kind of peanut butter having all the nutritive qualities of peanut butter, but being different as to flavor and physical texture. Dieticians know that peanut butter is rich in nutritive value. Its appeal to the purchasing public, however, is limited, for the reason that in its usual commercial form it is distasteful to many people, particularly adults, primarily because it has a tendency to stick to the mouth of the consumer and its mealy characteristic.

Moreover, from a merchandising standpoint, the cost of manufacturing the product and the resulting cost to the consumer is greater than it otherwise would be, were it possible to pack it in paper or fiber cartons instead of in the usual manner of packing it in glass jars. Both of these objectionable characteristics result from the fact that the melting point of the oil in peanut butter is lower than the normal temperature, with the attendant result that the oil rises to the top of the jar. This fact makes for a non-uniform consistency in peanut butter, and that portion of the peanut butter being nearer the bottom of the jar, being dryer, is less palatable and has a greater tendency to stick to the mouth of the consumer. Furthermore, the oil has a tendency to permeate a paper or fiber carton, thereby making the use thereof impractical from a merchandising standpoint.

I have found that an intimately commingled mixture of peanut butter and milk will overcome these objectionable charactertistics, for the milk combines with the peanut butter in such a manner as to hold the oil uniformly in suspension, with the result that the product is one of uniform consistency, and can be packed in waxed paper cartons like butter.

The kettle in which the product is made is provided with a mixing device which mixes continuously as the mixture is being made and when taken from the kettle the product can be immediately bottled or packaged and the oil of the peanut butter remains in even suspension permanently so that a stable product is produced which can be kept indefinitely without any separating out of the peanut butter oils. The process can be varied considerably with regard to the percentage used but so long as milk and peanut butter oils are combined within certain limits, the results will be substantially the same and a stable product will be produced. In describing the present invention I have referred to milk broadly and it is to be understood that I intend this term to include whole milk, skimmed milk or condensed milk. In the event plain milk is used or partially condensed milk, then the sugar which is added to the batch has the additional function of absorbing the moisture contained in the milk so that there will not be any separating out of the oil from the moisture. It has been found that by using the combination of peanut butter and milk that the oil of the peanut butter is emulsified by contact with the milk and broken up into very fine particles and it is this step which causes the even suspension of the oil throughout the product.

I further desire it to be understood that the mixing can take place in any suitable manner either by mechanically mixing the same by means of a paddle or other implements or the mixture can be produced by shaking so that the mixing operation is completed.

I have also found by experiment that the adding of sugar and/or chocolate produces a very tasty product and that a slightly caramel flavor may be imparted to the product by slowly boiling the milk and the sugar before mixing the same with the peanut butter. While I do not intend to be limited to the proportions hereinafter set forth, as is indicated by the appended claims, I have found by experiment that a mixture of ten to seventy-five per cent by volume of peanut butter, two to thirty-five per cent by volume of condensed milk, and as much as fifty per cent by volume of sugar (the milk and sugar being slowly boiled before mixing with the peanut butter, if it is desired to impart a caramel flavor to the product) results in producing a very appetizing food product, which will not stick to the mouth of the consumer and which may be packed in paper or fiber cartons, without losing its natural oil content or its normal color to any appreciable degree. It also has a smoother and more attractive appearance.

In the production of this product on a commercial scale, it is preferred to employ condensed or dried milk so as to simplify the cooking operation and facilitate the handling of materials.

I claim:

1. A food product comprising a mixture of peanut butter and milk.

2. A food product comprising an intimately commingled mixture of peanut butter and condensed milk.

3. A food product comprising an intimately commingled mixture of peanut butter in ten to seventy-five per cent by volume, condensed milk in two to thirty-five per cent by volume and sugar in one to fifty per cent by volume.

Signed at Chicago this 29th day of March, 1926.

ALBERT E. KIDD, Jr.

condensed or dried milk so as to simplify the cooking operation and facilitate the handling of materials.

I claim:

1. A food product comprising a mixture of peanut butter and milk.

2. A food product comprising an intimately commingled mixture of peanut butter and condensed milk.

3. A food product comprising an intimately commingled mixture of peanut butter in ten to seventy-five per cent by volume, condensed milk in two to thirty-five per cent by volume and sugar in one to fifty per cent by volume.

Signed at Chicago this 29th day of March, 1926.

ALBERT E. KIDD, JR.

CERTIFICATE OF CORRECTION.

Patent No. 1,620,898.     Granted March 15, 1927, to

ALBERT E. KIDD, JR.

It is hereby certified that error appears in the printed specification of the above numbered patent requiring correction as follows: Page 2, lines 5, 7 and 10, claims 1, 2 and 3 respectively, before the word "food" insert the word "stable"; and that the said Letters Patent should be read with this correction therein that the same may conform to the record of the case in the Patent Office.

Signed and sealed this 29th day of March, A. D. 1927.

M. J. Moore,
Acting Commissioner of Patents.

Seal.

CERTIFICATE OF CORRECTION.

Patent No. 1,620,898.                                                     Granted March 15, 1927, to

ALBERT E. KIDD, JR.

It is hereby certified that error appears in the printed specification of the above numbered patent requiring correction as follows: Page 2, lines 5, 7 and 10, claims 1, 2 and 3 respectively, before the word "food" insert the word "stable"; and that the said Letters Patent should be read with this correction therein that the same may conform to the record of the case in the Patent Office.

Signed and sealed this 29th day of March, A. D. 1927.

Seal.                                                                         M. J. Moore,
                                                                          Acting Commissioner of Patents.